W. SHAW.
MACHINE FOR SETTING FASTENERS.
APPLICATION FILED SEPT. 30, 1913.
1,231,210.
Patented June 26, 1917.
5 SHEETS—SHEET 5.
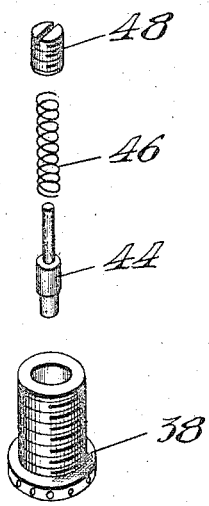
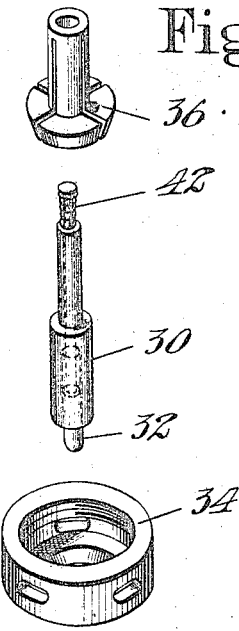
Fig. 10.
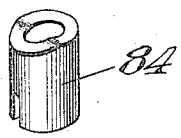
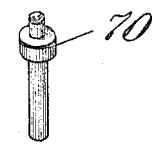
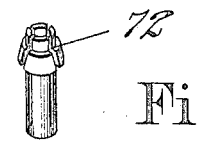
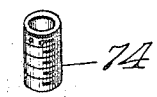
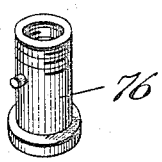
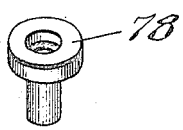
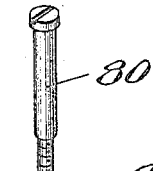
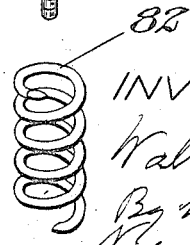
Fig. 11.
WITNESSES.
Elizabeth C. Coupe
C. Blanche Hargraves
INVENTOR.
Walter Shaw
By his Attorney,
Nelson W. Howard

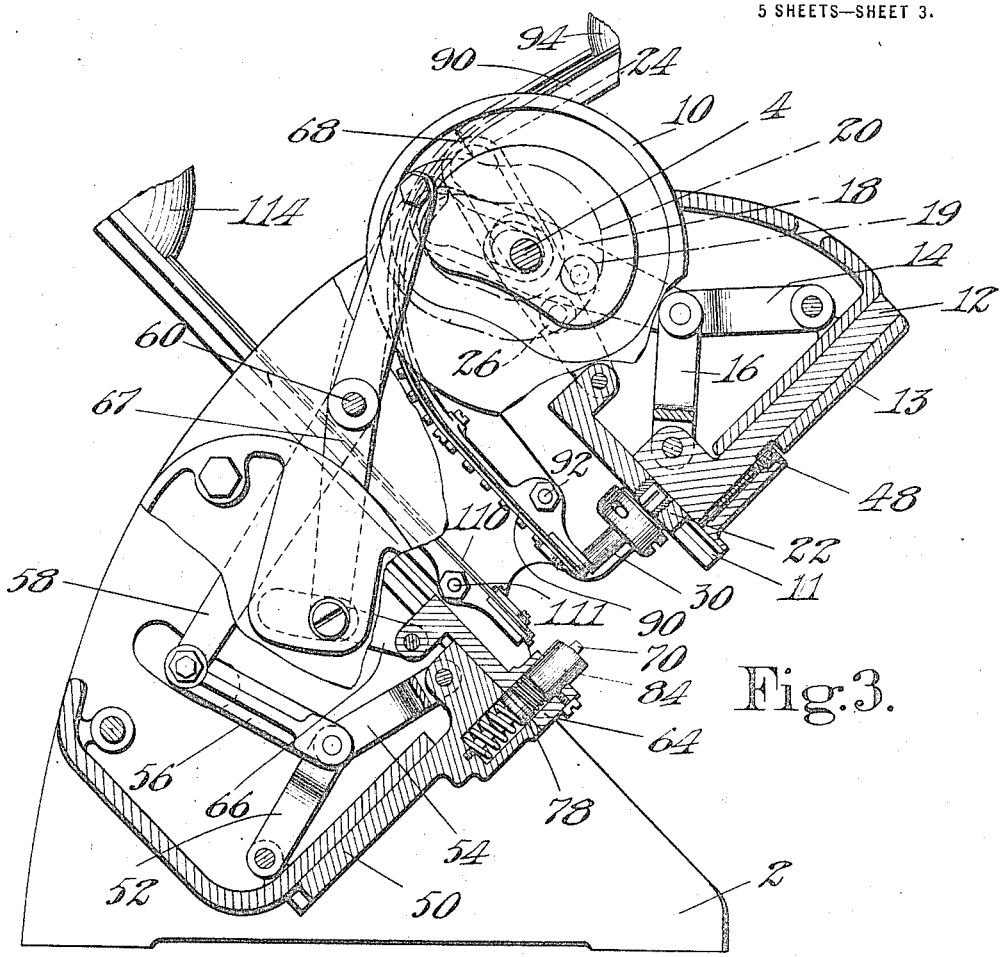
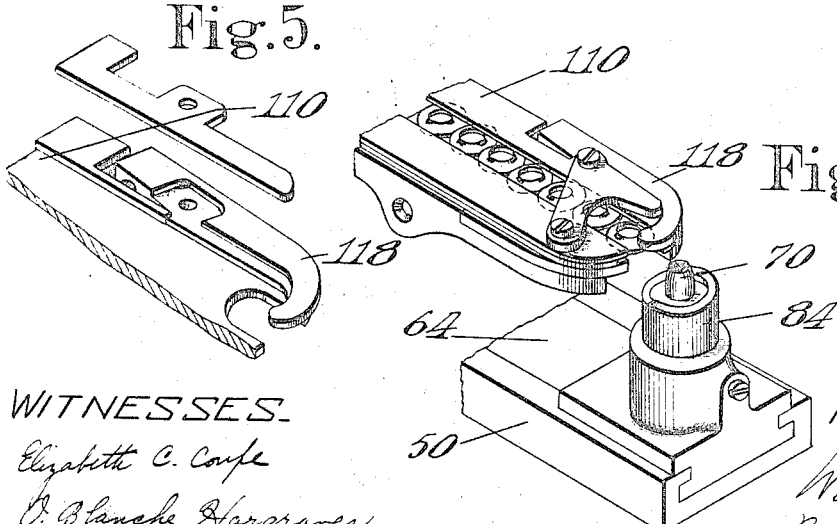

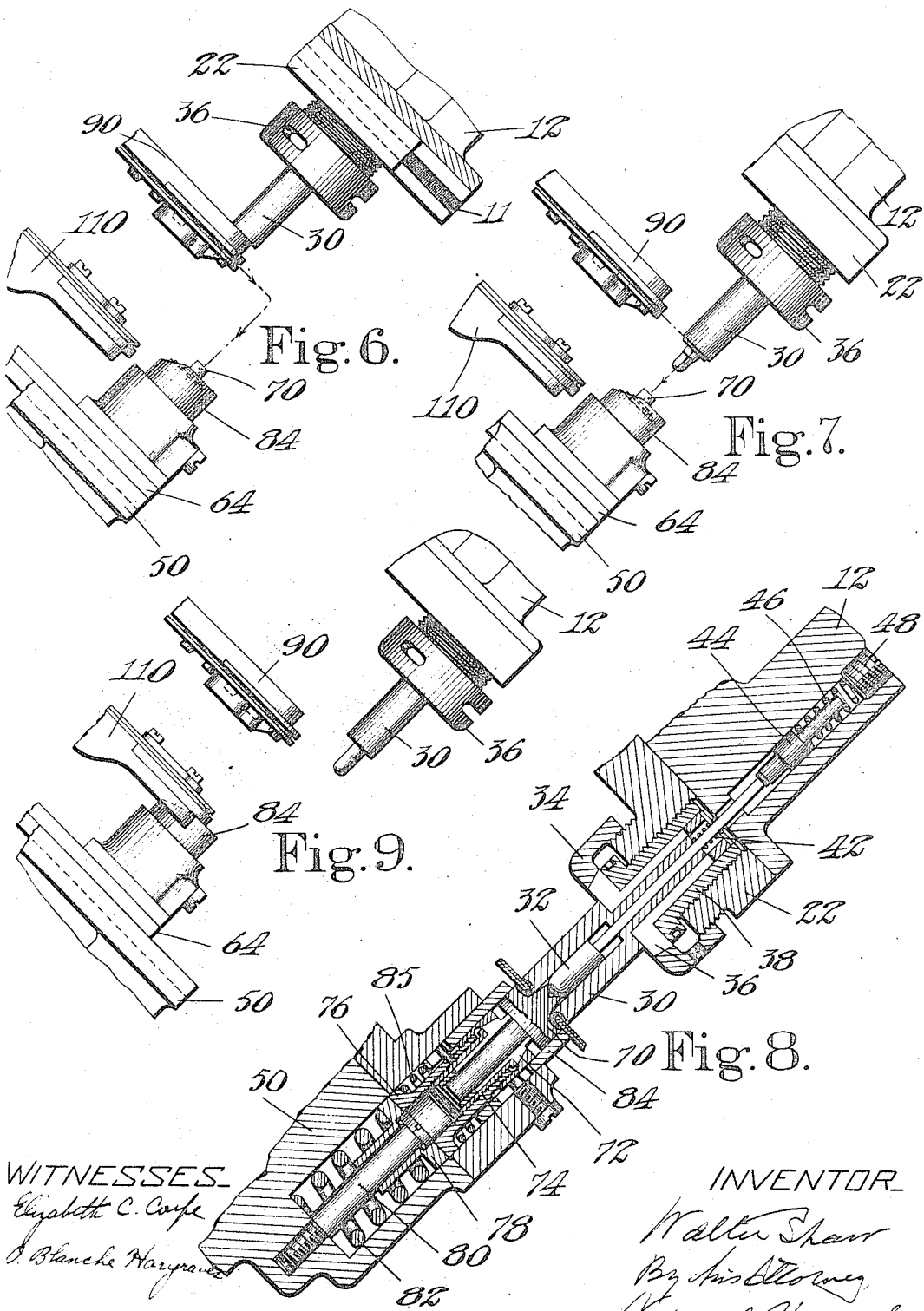

UNITED STATES PATENT OFFICE.

WALTER SHAW, OF DEDHAM, MASSACHUSETTS, ASSIGNOR TO UNITED SHOE MACHINERY COMPANY, OF PATERSON, NEW JERSEY, A CORPORATION OF NEW JERSEY.

MACHINE FOR SETTING FASTENERS.

1,231,210.   Specification of Letters Patent.   Patented June 26, 1917.

Application filed September 30, 1913. Serial No. 792,623.

*To all whom it may concern:*

Be it known that I, WALTER SHAW, a citizen of the United States, residing at Dedham, in the county of Norfolk and State of Massachusetts, have invented certain Improvements in Machines for Setting Fasteners, of which the following description, in connection with the accompanying drawings, is a specification, like reference characters on the drawings indicating like parts in the several figures.

This invention relates to machines for setting fasteners, such as gromets, eyelets, lacing studs, etc., in sheet material and is shown herein as embodied in a machine for setting gromets and washers in textile goods, although many of its features have a more general application.

It is an object of the invention to provide a machine having automatic mechanism for presenting a gromet to one setting die and a washer to the other so that the operator has only to present the work and start the machine in order that the barrel of the gromet may be passed through the hole in the washer and clenched upon its outer surface. In the manufacture of sails, hammocks, and similar goods such a machine is of great assistance.

An important feature of the invention consists broadly in setting devices which are arranged to move to and from stationary raceways in supplying themselves with the requisite fastener parts. Many advantages result from this construction. In the first place, in the machine the point of presentation of the work is left entirely unobstructed and there is no danger that either the work or the operator's hands will be harmed, as might result if raceways were moved intermittently into the space between the sets; then, the upper die may be arranged to occupy an initial position out of line with the lower die, and the presentation of the work still further facilitated by affording the operator an unobstructed view of the lower die upon which it is customary to locate the work; further, the lower die may be arranged to occupy its setting position initially so that the work may be held at rest during the setting operation; and still further, the construction and mounting of the raceways may be simplified and the whole operation of the machine rendered more positive and more quiet than heretofore.

The employment of stationary raceways is of particular importance in a machine for handling gromets and washers as the quantity of these articles necessary to supply the machine for any length of time amounts to very considerable weight and the raceways to accommodate them are large and heavy. The operation of the machine at a high speed is, therefore, very greatly facilitated by making the raceways stationary. It is believed that heretofore no machine of this type has been put into practical operation.

In the machine herein disclosed the gromets are supplied by the upper raceway and set by an inverted die. In this connection another feature of the present invention consists in arranging the die to move from receiving position at the raceway end to setting position above the work more quickly than the gromet will fall under the influence of gravity. The construction of the upper die is thus simplified and the necessity for a retaining spring or other device for such purpose is obviated.

Other important features of the invention reside in the mechanical construction of the various elements and in their coöperative arrangement whereby the operations above outlined are rendered possible or improved in their character.

These and other features of the invention will be best understood and appreciated from the following description of a preferred embodiment thereof selected for the purposes of illustration and shown in the accompanying drawings in which;

Fig. 3 is a side view of the machine partly in section.

Figs. 4 and 5 are views in perspective illustrating parts of the lower raceway and setting die.

Figs. 6 and 7 show the setting dies in two different positions occupied by them in a cycle of the machine.

Fig. 8 is a sectional view showing the position of the setting dies in the setting operation.

Fig. 9 shows the setting dies in one of their intermediate positions.

Figs. 10 and 11 illustrate the separate parts of the upper and lower setting dies with their mountings.

Figure 1:
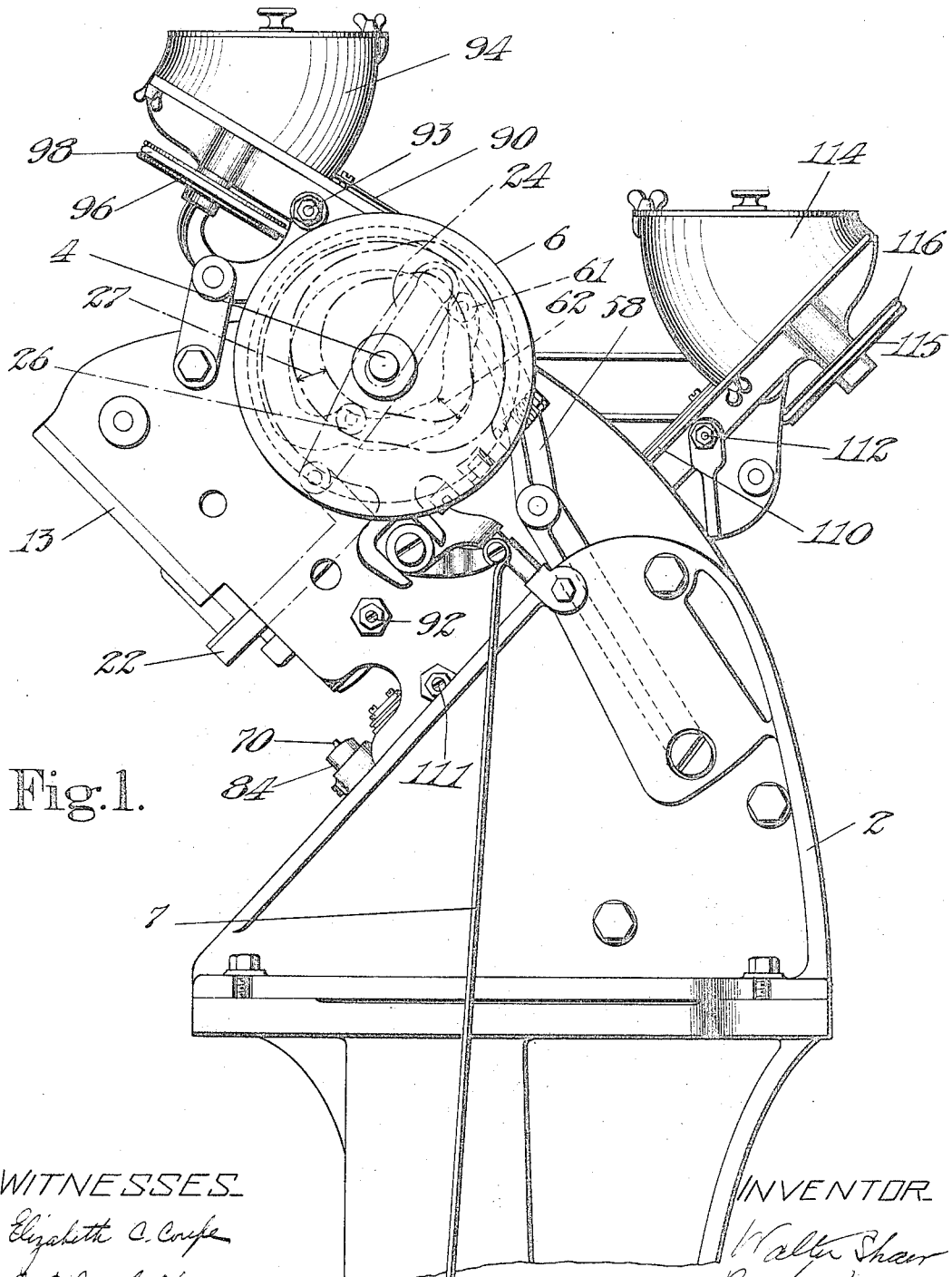
Figure 1 is a view of the machine in side elevation.
Figure 2:
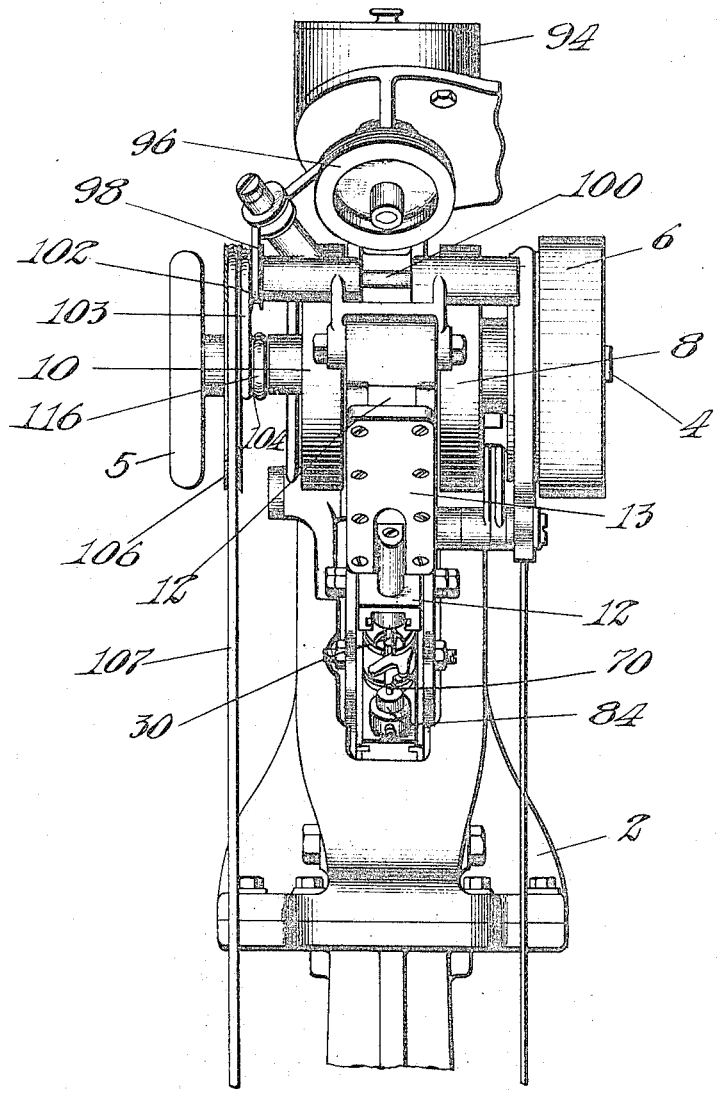
Fig. 2 is a view of the machine in front elevation.

The machine frame 2 is so shaped as to carry the setting dies on an angle of about 45°, an arrangement which facilitates the presentation of work to the machine. The frame 2 is provided with bearings for the main shaft 4 which carries at one end a hand wheel 5, and at the other end a driving pulley 6. The pulley 6 is arranged to be clutched to the shaft 4 by mechanism connected with the treadle rod 7. As any desired form of clutch mechanism may be employed, there is no occasion for a specific description of such mechanism herein.

The shaft 4 extends outwardly on either side of the frame 2 and has secured to it a pair of cam disks 8 and 10, one being located adjacent to either side of the frame. In the faces of these cam disks are formed cam grooves by which the various instrumentalities of the machine are actuated.

In the upper portion of the frame 2 is provided a guideway for a reciprocating head 12, a face plate 13 secured to the frame covering the upper portion of the head. The head is reciprocated by the toggle links 14 and 16 which are connected to the link 18. The link 18 is slotted at its rear end to straddle the main shaft 4, which thus acts as a guide for the link, and is provided with a cam roller 19 arranged to run in the cam groove 20 formed in the inner face of the cam disk 10.

At its lower end the head 12 is provided with transverse guide-ways 11 in which is mounted a sliding plate or carrier 22 for the upper setting die. The carrier 22 is reciprocated transversely in order to move the setting die 30 back and forth between its setting position, which is in line with the axis of head 12, and the delivery end of the stationary raceway 90 by which this setting die is supplied with gromets. At its rear end the carrier 22 is pivotally connected to a link 24 slotted to receive the shaft 4 similarly to the link 18 and carrying the cam roller 26 which runs in the cam groove 27 formed in the inner face of the cam disk 6. The cam grooves 27 and 20 are so shaped as to impart the proper lateral and longitudinal movements to the setting die 30 as will be explained hereinafter.

The construction of the upper setting die 30 will be clear from Figs. 8 and 10 of the drawings. This die is shaped to receive a gromet and is provided with a center spindle 32 of such diameter as to center the gromet through which it is passed. The carrier 22 is provided with a threaded boss for the reception of a threaded adjustable bearing piece 38. The position of this piece 38 in the carrier determines the longitudinal position of the upper setting die 30. Loosely received within the bearing piece 38 is a split clamping member 36 having at its lower end a beveled flange. Within the clamping member 36 is received the shank of the setting die 30. A threaded cap 34 is screwed upon the boss of the carrier 22, and is provided with a beveled annular surface which contracts the split clamping member 36 upon the shank of the die 30 and at the same time clamps the flange of this member firmly against the end of the bearing piece 38.

It is important that the spindle 32 should be permitted to yield within the die 30 during the setting operation as indicated in Fig. 8. As herein shown this operation of the spindle 32 is secured by mounting a spring pressed plunger 44 in the head 12 in such a position that it will register with the end of the spindle 32 when the carrier 22 is moved into setting position. The plunger 44 has an end of reduced diameter and is normally held by the spring 46 in such position that its surface is flush with the inner surface of the guideway 11. The upper end of the bore in which the plunger 44 and its spring are received is closed by a screw plug 48 which permits convenient access to these parts of the machine if necessary. It will be understood that the spring 46 is of sufficient strength to hold the upper end of the spindle 32 normally within the carrier 22 so that there will be no interference with the transverse movement of the carrier. A small spring 42 encircles the upper end of the spindle 32 and serves to keep the spindle from dropping down while it is being moved to and from the raceway. In this movement the upper end of the spindle slides upon the face of the guideway 13 in the head 12.

In the lower portion of the frame 2 there is provided a guideway for the reciprocating head 50, which at its upper end is provided with a transverse guideway for the side plate or carrier 64 of the lower die 70. The head 50 is moved up and down by the toggle links 52 and 54 connected through the link 56 to a cam lever 58. The cam lever 58 is pivoted upon a transverse pin 60 and its upper end carries a cam roller 61 arranged to run in a cam groove 62 formed in the outer face of the cam disk 6. The carrier 64 is moved transversely to carry the setting die 70 back and forth between its setting position in line with the axis of the head 50 and the delivery end of the stationary raceway 110 by which it is supplied with washers. For this purpose the carrier 64 is pivotally connected at its rear end to a link 66 which in turn is connected to the lower end of a cam lever 67 also mounted on the pin 60. At its upper end the lever 67 is provided with a cam roller which runs in a cam groove 68 formed in the inner face of the cam disk 10.

The lower die 70 is provided with a shank which is received within a split clamping member 72, which rests upon an adjustable threaded bearing piece 71. The bearing piece 71 is threaded on a sleeve 76 which is slidingly mounted in a bore formed in the lower end of the carrier 64. Surrounding the sleeve 76 is a sleeve 84 of such diameter that it will slide freely upon the enlarged head of the die 70. This sleeve is normally held in its upper position by a spring 85 and is prevented from being ejected by a screw projecting through a part of the carrier 64 into a slot in the side of the sleeve 6 shown in Fig. 8. Movement between the sleeve 84 and the sleeve 76 is limited by a pin set in the side of the sleeve 76 and projecting into a slot in the sleeve 85 as shown in Figs. 8 and 11.

The lower setting die 70 and its associated parts are yieldingly backed up during the setting operation by a plug 78 arranged in a bore in the upper part of the head 50. The plug is arranged to slide upon a pin 80 set in the head 50 of the bottom of the bore and is normally retained with its surface flush with the surface guideway in the head 50 by a stiff compression spring 82. It will be seen that at all times except during the setting operation, the lower surface of the sleeve 76 will be maintained in the same plane as the bottom of the carrier 64 so that transverse movement of the latter will not be obstructed in any way.

When the upper end of the spindle 32, or the lower end of the sleeve 76 have been displaced sufficiently to enter the recesses in the respective heads which carry them the carriers 22 and 64 will be positively locked against transverse movement and there will be no danger of throwing the dies out of alinement even should the material hang heavy on the lower die or should other disturbing influence exist.

The upper raceway 90 by which the gromets are supplied is secured to the frame 2 in stationary but adjustable position by means of the screws 92 and 93 which are threaded through the sides of the frame as shown in Fig. 1. The raceway 90 extends rearwardly for some distance in a direction parallel to the movement of the carrier 22 and then curves upwardly to a point above the frame where it carries a hopper 94 in which the gromets are placed. The hopper 94 communicates with the raceway 90 through one or more parts of the usual construction and the gromets are caused to pass through such parts by a brush or similar agitator driven by a pulley 96 beneath the hopper. The pulley 96 is connected by the belt 98 with an intermediate pulley 102 on the transverse shaft 100 journaled in bearings formed in the frame 2. Through the belt 103 the pulley 102 is connected to another pulley 104 connected to a larger pulley 106 which runs freely on the shaft 4. The pulley 106 is driven by a belt 107 from a counter shaft or the like and is operated independently of the main driving connection to the machine so that the agitators in the hoppers may be rotated and the raceways filled with gromets and washers before the machine is set in operation or during the intermissions between setting operations.

It will be seen that the gromets are delivered from the hopper 94 with their barrels uppermost and that as they pass down the curved raceway 90 they are reversed so that the die 30 eventually picks each gromet from the raceway with its barrel projecting downwardly. A detent of the usual construction is located at the delivery end of the raceway 90 to prevent the gromets from running out of the raceway under the influence of gravity.

The lower raceway 110 which supplies washers to the die 70 extends in a straight line from its delivery end on washer hopper 114 and is secured to the frame in stationary but adjustable position by the screws 111 and 112 as shown in Fig. 1. The hopper 114 communicates with the raceway 110 through the usual parts and is provided with a brush or agitator driven by pulley 115. The latter is connected by a belt 116 to a small pulley turning with the larger pulley 106 above referred to, so that the agitators of both hoppers are both driven through independently of the machine and through the belt 107 as already explained.

Adjacent to its lower end the raceway 110 is provided with a pivoted detent 118 which normally retains the washers in the raceway but permits the endmost one to be picked off by the lower die 70.

It is desirable to locate the washer on the die 70 concentrically and spaced from the central projecting portion of the die in order that the gromet barrel may pass through the washer and be clenched properly upon its lower surface. One purpose of the sleeve 84 is to insure the correct location of the washer as it is drawn out of the raceway. When the head 50 is elevated with the die 70 beneath the raceway 110, in order to pass the die 70 through the lowermost washer, the sleeve 84 encounters the lower side of the raceway and yields downwardly as shown in Fig. 9. When the carrier 84 is subsequently moved toward the front with the die 70 engaging the washer, the sleeve 84, as soon as it is carried beyond the end of the raceway, is elevated to its normal position and locates the washer by engaging its rim. In order that the movement of the sleeve 84 may not be so abrupt as to displace the washer, the upper edge of the sleeve is beveled at its rear side and this insures a gradual movement of the sleeve 84 when it is permitted to rise.

The various cams are so shaped and the clutch mechanism so designed as to bring the machine to rest with its parts in the positions shown in Figs. 3 and 6. The carrier 22 for the upper die 30 occupies its rearmost position in which the die 30 is in line with the endmost gromet in the raceway 90 and the head 12 occupies its uppermost position. The lower die 70 occupies its setting position and has been supplied with a washer. The movement of the die 70 by which the washer is supplied takes place immediately after each setting operation and before the machine comes to rest. In the stopped position of the machine, therefore, the die 70 is provided with a washer.

In the normal operation of the machine the work is punched and threaded upon the die 70, as shown in Fig. 3, the washer being beneath the punched hole. The machine is then started by depressing the treadle rod 7 and the head 12 is immediately lowered sufficiently to cause the spindle 32 of the die 30 to pass into the barrel of the endmost gromet in the raceway 90. The carrier 22 is thereupon advanced forwardly to its setting position as indicated by the dotted path in Fig. 6, being also moved toward the work by the further depression of the head 12 as soon as the die 30 has cleared the end of the raceway. In Fig. 7 the parts are shown in an intermediate position. Immediately thereafter the head 12 is moved downwardly to the limit of its stroke and the setting operation completed with the parts in the position shown in Fig. 8. Subsequently the die 30 is elevated and returned to the position shown in Fig. 6. Meanwhile the carrier 64 of the lower die is moved rearwardly, the head 50 elevated, carrying the parts into the position shown in Fig. 9. Finally, the carrier 64 is returned to its forward position, the head 50 moved to its upper position and the machine stopped.

When the endmost gromet has been drawn out of the upper raceway it would naturally be free to fall, but the movement of the setting die 30 is much faster than the movement of the gromet which would be produced by gravity and the result is that the gromet remains in place upon the die by reason of its inertia.

Having thus described my invention, what I claim as new is:—

1. A machine of the class described having, in combination, stationary raceways, coöperating setting devices, one of which is shaped to upset a tubular fastener carried by the other, and means for moving both setting devices to their respective raceways to receive fasteners.

2. A machine of the class described having, in combination, stationary raceways, coöperating setting devices, and means for moving both setting devices one after the other to its raceway to receive a fastener.

3. A machine of the class described having, in combination, a pair of raceways, coöperating setting devices, means for moving one of said devices from its raceway into setting position, means for relatively moving the devices to perform a setting operation, and means subsequently acting to move the other of said setting devices from its setting position to the other raceway.

4. A machine of the class described having, in combination, a pair of raceways, a pair of coöperating setting devices relatively movable to perform a setting operation, and means for moving one of the setting devices to its raceway before the setting operation and the other setting device to its raceway after the setting operation.

5. A machine of the class described having, in combination, a pair of setting devices, one of which initially occupies its setting position, a raceway terminating at a point on one side of the initial position of said setting device, and means for moving said device to the raceway and back to initial position after each setting operation.

6. A machine of the class described having, in combination, a pair of setting devices disposed in a vertical plane, one of which initially occupies its setting position, a raceway terminating at a point on one side of and below the initial position of said setting device, and means for moving said device sidewise and down to the raceway and then up and transversely to initial position after each setting operation.

7. A machine of the class described having, in combination, a reciprocatory head containing a yielding support, and a setting device arranged to be moved on the head transversely to the path of movement of the head and to be yieldingly backed up by said yielding support in one of its positions on the head.

8. A machine of the class described having, in combination, a head having a transverse guideway, and a bore leading to said guideway and containing a yielding support, a carrier movable in the guideway, and a setting die in the carrier arranged to be backed up by the support.

9. A machine of the class described having, in combination, a head having transverse guideways, a yielding support flush with a portion of the guideways, a carrier movable in the guideways, and a setting device in the carrier arranged to slide upon the guideways during the movement of the carrier and to rest in the yielding support when in setting position.

10. A machine of the class described having, in combination, a head having transverse guideways with a recess at a predetermined point therein, and a setting device transversely movable in the guideways and arranged to be locked against transverse movement by being projected into said recess when in a predetermined position, 11. A machine of the class described having, in combination, a head containing a spring pressed plunger, a slide carrier movable transversely, a setting device having a spindle arranged to be brought into and out of alinement with the plunger by the movement of the carrier, and means for adjusting the position of the setting device in the slide carrier.

12. A machine of the class described having, in combination, a raceway for fasteners, a head movable in a path remote from the end of the raceway and carrying a guideway extending toward the raceway, and a setting die bodily movable in the guideway toward or from the raceway.

13. A machine of the class described having, in combination, a setting die arranged to hold a washer, a washer raceway for supplying said die, and a washer locating device arranged to be rendered inoperative during the supplying operation.

14. A machine of the class described having, in combination, a longitudinally movable setting die, a raceway associated therewith, and a yielding sleeve surrounding the die, said die and raceway being relatively movable transversely and the sleeve being arranged to be retracted and then projected during such relative transverse movement.

15. A machine of the class described having, in combination, a pair of oppositely movable heads having parallel transverse guideways, a setting die mounted in each guideway, means for simultaneously moving one head longitudinally and its associated die transversely, and means acting thereafter for moving the other head longitudinally and its associated die transversely.

16. A machine of the class described having, in combination, a pair of oppositely movable heads having parallel transverse guideways, a setting die mounted in each guideway, means for moving one die transversely out of setting position after the setting operation, and means for simultaneously moving the other die out of and then back to its setting position.

17. A machine of the class described having, in combination, a pair of opposed reciprocatory heads, a setting device mounted in each head for transverse movement, means for moving first one head and then the other toward setting position, and means for moving first one setting device and then the other into setting position on its respective head.

18. A machine of the class described having, in combination, a frame carrying a shaft with cams secured thereto on opposite sides of the frame, setting dies disposed centrally of the frame and relatively movable to perform the setting operation, said dies being also movable transversely to and from fastener receiving position, and connections between said cams and dies for effecting said movements.

19. A machine of the class described having, in combination, a frame having guideways for oppositely disposed heads, toggles for operating the heads, die carriers slidable on each head, a cam shaft journaled in said frame, link connections between the cam shaft, the toggle, and the die carrier of the upper head, a journal pin disposed below the cam shaft, cam levers journaled thereon, and link connections between said cam levers, the toggle, and the die carrier of the lower head.

20. A machine of the class described having, in combination, coöperating setting dies, carriers for the dies arranged for movement in alined paths, one of said dies being movable in its carrier from front to rear of the machine, and automatic means for shifting the position of one die in its carrier after the machine has been started and prior to the setting operation.

21. A machine of the class described having, in combination, a raceway for delivering a fastener in inverted position, and a setting device constructed and arranged to engage the fastener loosely and carry it down to setting position at a speed faster than the fastener would fall freely through the same distance.

22. A machine of the class described having, in combination, coöperating setting devices one of which is arranged to loosely engage a tubular fastener and carry it down to setting position at a speed faster than the fastener would fall freely through the same distance.

23. A machine of the class described having, in combination, a raceway for delivering inverted gromets, a setting die having a spindle arranged to fit loosely in the gromet barrel and draw the gromet from the raceway, and means for moving the setting die downwardly at a speed such that the gromet has not time to be displaced on the die by gravity.

In testimony whereof I have signed my name to this specification in the presence of two subscribing witnesses.

WALTER SHAW.

Witnesses:
FRANK L. RUMNEY,
HERBERT W. KENWAY.